US010882264B2

(12) United States Patent
Uijlenbroek

(10) Patent No.: US 10,882,264 B2
(45) Date of Patent: Jan. 5, 2021

(54) RFID TIRE PLUG AND METHOD OF INSTALLING THE SAME IN A MANUFACTURED TIRE

(71) Applicant: FineLine Technologies, Norcross, GA (US)

(72) Inventor: Jos Uijlenbroek, Ophemert (NL)

(73) Assignee: FINELINE TECHNOLOGIES, Norcross, GA (US)

( * ) Notice: Subject to any disclaimer, the term of this patent is extended or adjusted under 35 U.S.C. 154(b) by 0 days.

(21) Appl. No.: 16/243,374

(22) Filed: Jan. 9, 2019

(65) Prior Publication Data

US 2019/0217562 A1    Jul. 18, 2019

Related U.S. Application Data

(60) Provisional application No. 62/617,801, filed on Jan. 16, 2018.

(51) Int. Cl.
*B29D 30/00* (2006.01)
*B60C 19/00* (2006.01)
*G06K 19/077* (2006.01)

(52) U.S. Cl.
CPC .......... *B29D 30/0061* (2013.01); *B60C 19/00* (2013.01); *G06K 19/0773* (2013.01); *G06K 19/07764* (2013.01); *B29D 2030/0077* (2013.01); *B60C 2019/004* (2013.01)

(58) Field of Classification Search
None
See application file for complete search history.

(56) References Cited

U.S. PATENT DOCUMENTS

| | | | |
|---|---|---|---|
| 2006/0164250 A1 | 7/2006 | Kawai | |
| 2007/0146143 A1* | 6/2007 | Cote | G06K 19/07749 340/572.8 |
| 2007/0250358 A1* | 10/2007 | Le | G07G 1/0045 340/572.1 |
| 2008/0303674 A1* | 12/2008 | Hara | B60C 23/0493 340/572.8 |

(Continued)

FOREIGN PATENT DOCUMENTS

| | | | |
|---|---|---|---|
| EP | 1798074 A1 | 6/2007 | |
| EP | 2186658 A1 | 5/2010 | |
| EP | 2191715 A1 * | 6/2010 | ........... A01K 11/004 |

OTHER PUBLICATIONS

Extended European Search Report (EESR—favorable) for EP 19151849.7 dated Jun. 14, 2019 (9 pages).

*Primary Examiner* — Matthew J Daniels
*Assistant Examiner* — Mohammad M Ameen
(74) *Attorney, Agent, or Firm* — Shumaker, Loop & Kendrick, LLP

(57) ABSTRACT

RFID plugs and methods of installing the same within a rubber article. When included in the rubber article, the RFID plugs maintain operability pre-vulcanization, during vulcanization, and post-vulcanization to identify, track, and/or sense conditions of the rubber article. The RFID plugs are adapted to be affixed to the rubber article and include, for example, an elongate stem; a head disposed at a first end of the stem, the head containing an RFID device; and a retention feature disposed at a second end of the stem opposite the first end, the retention feature configured to resist pulling forces on the head and the stem.

18 Claims, 4 Drawing Sheets

(56) References Cited

U.S. PATENT DOCUMENTS

| | | | | |
|---|---|---|---|---|
| 2010/0123584 | A1* | 5/2010 | Lionetti | B60C 23/041 340/572.8 |
| 2011/0248830 | A1* | 10/2011 | Jeppesen | A01K 11/004 340/10.1 |
| 2015/0314542 | A1* | 11/2015 | Tucker | H01Q 1/2225 235/492 |

* cited by examiner

RFID TIRE PLUG AND METHOD OF INSTALLING THE SAME IN A MANUFACTURED TIRE

TECHNICAL FIELD

The present invention relates generally to an RFID device for tracking a tire during manufacture and thereafter, and more particularly, to an RFID device integrated and/or encased within a rigid plastic body configured to be installed in a tire during tire manufacture, which subsequently becomes an integral part of the tire after manufacture. The RFID device preferably and advantageously maintains operability throughout and after tire manufacture allowing for identification, tracking, and/or sensing conditions of the tire during tire manufacture and thereafter.

BACKGROUND

Articles are commonly identified and monitored during manufacture and thereafter for inventory control purposes, and often, these articles are also further monitored throughout their life. A common practice in many fields is to apply a label (e.g., a bar coded label) to an article containing an identifier or other information associated with the article.

Regarding tire manufacture, to which the present invention finds particular application, identifying tires and other rubber-based articles can be problematic, particularly if the identification occurs prior to fabrication and/or before production is complete. Tires and a wide array of other rubber-based articles are subjected to one or more harsh vulcanization processes in which the tire or tire components are fused or molded together. Vulcanization modifies the rubber-based composition by forming an extensive network of crosslinks within the rubber matrix, thereby significantly increasing the strength and durability of the article.

Although numerous vulcanization systems/techniques are known (e.g., peroxide or sulfur based curing systems), nearly all vulcanization systems/techniques include the application of high pressure and elevated temperatures to the "green," i.e., non-vulcanized, rubber-based article to facilitate cross-linking reactions and the curing process when forming the desired vulcanized, rubber-based article(s).

In view of the above mentioned harsh, vulcanization process conditions, adhesive labels (e.g., bar coding labels) have been developed that can be applied to green rubber-based articles such as tires. Although these adhesive labels can endure the relatively high temperatures and pressures associated with vulcanization, these labels frequently become inoperable and/or have decreased operability during the vulcanization process due to the label's inability to completely withstand the harsh vulcanization process conditions and further due to the label's placement on these article(s), which include "line of sight" limitations. This loss of operability and/or failure to maintain adequate operability frequently leads to decreased tire production and increased expense due to re-labeling and/or tagging of the rubber-based articles post-vulcanization. In view of the above, a need remains for alternative and improved article identification provisions and strategies for tracking articles, and particularly tires, during production, distribution, inventory, and product lifetime that overcomes the above mentioned problems.

SUMMARY

In one aspect, the inventive concepts disclosed herein are directed to a tire identification, sensing, and/or tracking device, also referred to herein as an "RFID plug", that allows for identifying, tracking, and/or sensing conditions of the tire during tire manufacture and thereafter while further avoiding the problems currently observed with various conventional adhesive labels. The RFID plug includes an RFID, RF transponder, sensors, and/or RFID tag molded or otherwise incorporated within a rigid body formed of polyethylene terephthalate (PET), polypropylene (PP), polyethylene (PE) (e.g., high-density polyethylene (HDPE)), polyurethanes (e.g., thermoplastic polyurethane(s) (TPUs)), thermoplastic elastomers (TPE) (e.g., styrenic block copoloymers (TPS), thermoplastic polyolefinelastomers (TPO), thermoplastic vulcanizates (TPV), thermoplastic copolyester (TPC), thermoplastic polyamides (TPA)), or other rigid plastic body (collectively referred to rigid plastic body) by way of a molding or extrusion or like process.

In certain aspects, also disclosed is a method for temporarily or, more preferably, permanently affixing the RFID plug(s) disclosed herein to the rubber article (tire) by:

(1) providing a green and/or unvulcanized rubber article (green and/or unvulcanized rubber tire) and an RFID plug to be affixed to the rubber article, the RFID plug being configured to track, identify, and/or sense conditions of the rubber article pre-vulcanization, during vulcanization, and post-vulcanization;

(2) either before or concurrently with step (3), either manually or automatically inserting portions of the RFID plug (retention feature and stem) into the green and/or unvulcanized rubber article;

(3) placing the green and/or unvulcanized rubber article into a mold (tire mold) for vulcanization; and (4) vulcanizing the rubber article of step (3) by applying appropriate temperature and pressure thereby forming a vulcanized rubber article with the RFID plug positioned therein (vulcanized tire with RFID plug positioned therein), wherein the RFID plug maintains operability throughout steps (1)-(4) thereby allowing for tracking, identifying, and/or sensing of the rubber article pre-vulcanization, during vulcanization, and post-vulcanization. After molding/vulcanization, the RFID, RF transponder, and/or RFID tag preferably becomes an inseparable part of the finished plug and moreover the finished plug is integrally included within the vulcanized article.

In another aspect, the rigid plastic body may include an integral retention feature for securely attaching the RFID plug to or within the tire and preventing plug pull-out, thereby providing an inseparable connection to the green non-vulcanized tire and the finished tire.

In yet another aspect, the inventive concepts disclosed herein are directed to a method of identifying a rubber-based article during manufacture and after production using an RFID device.

In certain aspects disclosed is an RFID plug adapted to be affixed to a tire pre-vulcanization that maintains operability for scanning, identifying, and/or sensing conditions of the tire before, during, and post-vulcanization of the tire, the RFID plug including an elongate stem; a head disposed at a first end of the stem, the head containing an RFID device that is configured for scanning, identifying, and/or sensing conditions of the tire and to further communicate the same to an RFID reader; and a retention feature disposed at a second end of the stem opposite the first end, the retention feature configured to resist pulling forces on the head and the stem.

In certain aspects, the head is enlarged relative to the elongate stem and retention and includes an upper planar surface and a lower planar surface with the RFID device sandwiched there between such that the RFID device is completely encased within the head.

In certain aspects, the retention feature is conical shaped having a pointed end that forms a distal end of RFID plug and a planar surface spaced apart from the pointed end that is directly connected to the elongate stem.

In certain aspects, the planar surface of the retention feature flares out beyond an outer diameter of the elongate stem and is configured to retain the RFID plug within the tire by resisting pulling forces in a direction away from the tire (e.g., by gripping internal portions of the tire) to secure the RFID plug within the tire.

In certain aspects, the head has a predeteremined shape comprising one of a circular/disc shape, a cuboid shape, a rectangualar shape, a rhomboid shape, a star shape.

In certain aspects, the head is circular/disc shaped and has a greater outer diameter than the elongate stem and the retention feature.

In certain aspects, the plug further includes an RFID device supporting substrate on which the RFID device is positioned, the supporting substrate being positioned between the upper and lower planar surfaces of the head.

In certain aspects, the RFID device supporting substrate corresponds in shape with the upper and lower surfaces of the head.

In certain aspects, the elongate stem, head, and retention features are an interconnected assembly of individual parts that are configured to fuse together to form an unitary housing upon being subjected to vulcanizing/vulcanization conditions.

In certain aspects, also disclosed is a method for permanently affixing an RFID plug to a tire comprising: (1) providing a green and/or unvulcanized tire and an RFID plug to be affixed to the green and/or unvulcanized tire, the RFID plug being configured to track, identify, and/or sense conditions of the tire pre-vulcanization, during vulcanization, and/or post-vulcanization; (2) before or concurrently with step (3), either manually or automatically inserting portions of the RFID plug into the green and/or unvulcanized tire; (3) placing the green and/or unvulcanized tire into the mold for vulcanization; and (4) vulcanizing the tire of step (3) to form a vulcanized tire with the RFID plug positioned therein, wherein the RFID plug maintains operability throughout steps (1)-(4) thereby allowing for tracking, identifying, and/or sensing conditions of the tire pre-vulcanization, during vulcanization, and post-vulcanization.

In certain aspects, the RFID plug used in the method comprises an elongate stem; a head disposed at a first end of the stem, the head containing an RFID device that is configured for scanning, identifying, and/or sensing conditions of the tire and to further communicate the same to an RFID reader; and a retention feature disposed at a second end of the stem opposite the first end, the retention feature configured to resist pulling forces on the head and the stem.

In certain aspects, the retention feature and elongate stem of the RFID plug are inserted within the tire during step (2) while the head remains adjacent or coplanar with an outermost surface of the tire to facilitate scanning, identifying, and/or sensing conditions of the tire.

In certain aspects, steps (2) and (3) occur sequentially.

In certain aspects, steps (2) and (3) occur concurrently.

In certain aspects, the RFID plug is positioned within the mold and insertion of the RFID plug into the green and/or unvulcanized tire occurs upon placing the tire therein.

In certain aspects, also disclosed is a kit comprising one or more RFID plugs pre-packaged therein. In certain aspects, the kit further comprises an RFID reader pre-packagaed therein. In certain aspects, the kit comprises a plurality of different RFID plugs pre-packaged therein with identical RFID plugs being grouped together and separated from other different RFID plugs. In certain aspects, different plugs may include additional features distinguishing identical plugs from the different plugs within the kit. For example, the different plugs may have varied size, color, and/or structural configuration(s) of the plug(s).

The RFID device and methods disclosed herein can be used to track production processes, track inventory, maintenance, repair, fleet asset management, and may further sense one or more conditions including temperature, pressure, and/or humidity of the article during and/or after manufacture.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

Features, aspects and advantages of the present invention are better understood when the following detailed description of the invention is read with reference to the accompanying drawings, in which.

DETAILED DESCRIPTION

Figure 1:
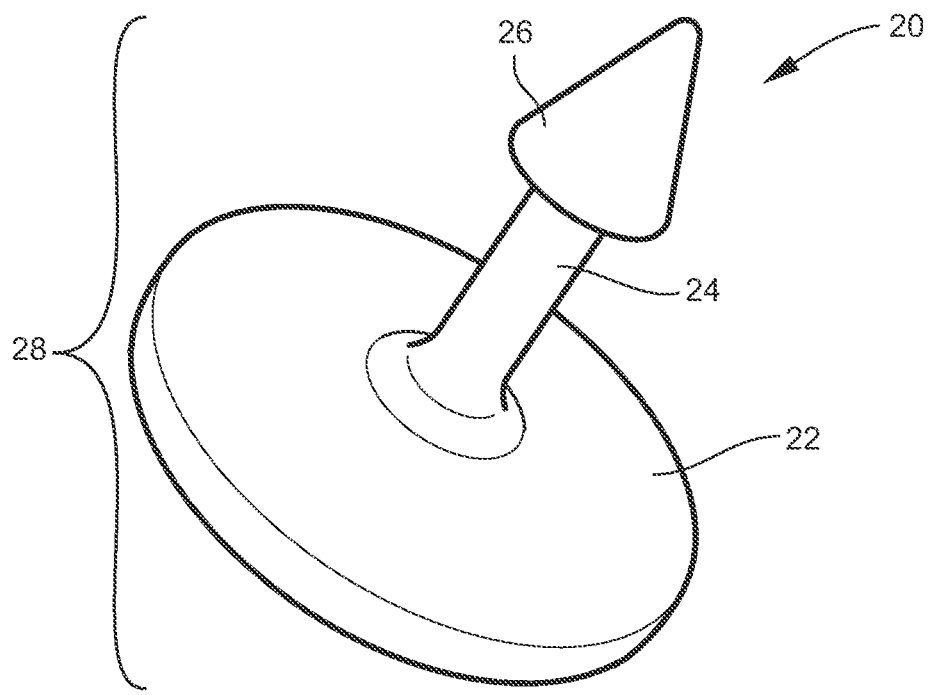
FIG. 1 is a bottom perspective view of an RFID plug according to an embodiment of the invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The inventive concepts disclosed herein are directed to RFID plugs, and methods for incorporating the same into rubber articles (i.e., tires) during, for example, tire manufacture, including an electronic identification provision such as a radio frequency identification device (RFID) incorporated in the plug. The plugs described herein are preferably configured to withstand pressures and temperatures associated with a wide variety of vulcanization processes and further maintain operability before, during, and after these processes and are further not hindered by "line of sight" limitations that are observed with the currently used adhesive labels.

In certain embodiments the RFID plug can withstand conditions associated with vulcanization processes without degradation. The term vulcanization as used herein generally refers to subjecting the rubber articles to various heating and pressure conditions to facilitate crosslinking conditions including heating to a temperature greater than 90° C. and up to 200° C. (or greater than 110° C. and up to 190° C.), for a predetermined time period of at least 10 minutes and up to 20 hours, of at least 1 hour and up to 17 hours, of at least 3 hours and up to 15 hours at a pressure of up to 200 tons (0.1 tons to 200 tons, 2 tons to 175 tons, 10 tons to 150 tons, 40 tons to 135 tons, or 60 tons to 110 tons).

The RFID plug generally includes at least one RFID component and/or device, as well as, in certain aspects sensors, LED, and other desired indicators. The at least one RFID device generally includes an antenna for wirelessly transmitting and/or receiving RF signals and analog and/or digital electronics operatively connected thereto. The RFID device can include passive REID devices, or active or semi-passive RFID devices including a battery or other power source. The electronics can be implemented via an integrated circuit (IC) or microchip or other suitable electronic circuit and may include, for example, communications electronics, data memory, control logic, etc.

The RFID device can operate in a variety of frequency ranges including, but not limited to, a low frequency (LF) range (i.e., from approximately 30 kHz to approximately 300 kHz), a high frequency (HF) range from approximately 3 MHz to approximately 30 MHz), an ultra-high frequency (UHF) range (i.e., from approximately 300 MHz to approximately 3 GHz) and ultra-wideband (UWB) range (from approximately 3 GHz to 11 GHz and passive, semi-active, or active), A passive device can operate in any one of the aforementioned frequency ranges. In particular, for passive devices, LF systems can operate at about 124 kHz, 125 kHz or 135 kHz, HF systems can operate at about 13.56 MHz, and UHF systems can use a band from 860 MHz to 960 MHz. Alternately, passive device systems can use 2.45 GHz and other areas of the radio spectrum. Active RFID devices can operate at about 455 MHz, 2.45 GHz, or 5.8 GHz. Semi-passive devices can operate at a frequency of about 2.4 GHz.

The read range of the RFID device (i.e., the range at which the MD reader can communicate with the RFID device) can be determined by the type of device (i.e., active, passive, etc.) and is not limited/hindered by "line of sight" limitations such as those observed with bar coded labels. In particular, the RFID device(s) and plug(s) disclosed herein may communicate and/or be read by an RFID reader either out of line of sight, in line of sight, or in partial line of sight. It should be noted that passive LF RFID devices (also referred to as LFID) can typically be read from within approximately 12 inches (0.33 meters); passive HF RFID devices (also referred to as HFID or HighFID) can typically be read from up to approximately 3 feet (1 meter); and passive UHF RFD devices (also referred to as UHFID devices) can typically be read from approximately 10 feet (3.05 meters) or more. One factor influencing the read range for passive RFID devices is the method used to transmit data from the device to the reader, the coupling mode between the device and the reader—which can be either inductive coupling or radiative/propagation coupling. Passive LFID devices and passive HFID devices can use inductive coupling between the device and the reader, whereas passive UHFID devices can use radiative or propagation coupling between the device and the reader.

Alternatively, in radiative or propagation coupling applications (e.g., as are conventionally used by passive UHFID devices), rather than forming an electromagnetic field between the respective antennas of the reader and device, the reader can emit electromagnetic energy that illuminates the device. In turn, the device gathers the energy from the reader via an antenna, and the device's IC or microchip uses the gathered energy to change the load on the device antenna and reflect hack an altered signal, i.e., backscatter. UHFID devices can communicate data in a variety of different ways, e.g., increase the amplitude of the reflected wave sent back to the reader (i.e., amplitude shift keying), shift the reflected wave out of the phase received wave (i.e., phase shift keying), or change the frequency of the reflected wave (i.e., frequency shift keying). The reader in turn picks up the backscattered signal and converts the altered wave into data understood by the reader or adjunct computer.

The antenna employed in the RFID device can be affected by numerous factor, e.g., the intended application, the type of device (i.e., active, passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices can be provisioned with a coil antenna having many turns in order to produce enough voltage to operate the device IC or microchip. Comparatively, a conventional HFID passive device can be provisioned with an antenna which is a planar spiral (e.g., with 5 to 7 turns over a credit-card-sized form factor), to provide read ranges on the order of tens of centimeters. HFID antenna coils can be less costly to produce (e.g., compared to LFID antenna coils), since they can be made using techniques relatively less expensive than wire winding, e.g., lithography or the like. UHFID passive devices can be radiatively and/or propagationally coupled with the reader antenna and consequently can employ conventional dipole-like antennas.

The RFID plug of the present invention can utilize any of the aforementioned RFID devices, as well as others not specifically mentioned. In one embodiment, the RFID device is a passive device.

The RFID plug according to the invention can be installed during tire manufacture such that the RFID plug becomes an integral, inseparable part of the tire. Unlike the adhesive labels currently used in the field, the RFID plugs disclosed herein do not require adhesive to remain attached/affixed to the tire. Instead, the RFID plugs disclose herein may utilize a friction fit with the retention feature of the plug disclosed herein configured to grip internal portions of the article/tire to further prevent removal therefrom. As discussed herein, the RFID plug preferably remains operable before, during, and after vulcanization to track, identify, and/or sense conditions of the article. However, in the event that the RFID plug become inoperable, breaks or otherwise fails, the existing plug can be removed by, for example, a physical means such as drilling out the existing plug and stamping a new plug into the tire. Alternatively, the RFID plug may be removed and replaced by heating the article to generally form a hole/aperture/recess and subsequently removing the inoperable RFID plug and inserting/stamping the new plug into the tire. In certain aspects, each of the above RFID plug replacement methods occur post-vulcanization, and in either of the above mentioned RFID plug replacement methods, the replacement RFID plug may be held in place via a physical/friction fit with the tire and/or an adhesive may be applied on and/or over the replacement RFID plug that further secures and affixes the replacement plug to the tire without further affecting the operability thereof.

The RFID plug can be affixed to and/or incorporated within a wide array of tires. As will be appreciated, tires are typically used in combination with rims of a vehicle. The rubber-based tire provides support and gripping for the vehicle with a road or ground surface. The RFID plug can be used with bias tires, belted bias tires, radial tires, solid tires, semi-pneumatic tires, pneumatic tires, airless tires, tweel/twheel (i.e., an airless tire integrated with a rim), etc. All tires generally include an outer tread/continuous tracks, a bead that contacts a rim upon installation of the tire, and sidewalls that extend between the tread and bead. As discussed in detail below, the RFID plug can be incorporated into the sidewall to facilitate reading from alongside the tire as well as avoid damage impact damage to the RFID plug.

The RFID plug is suitable for use with other articles, including other rubber-based and non-rubber-based articles. Non-limiting examples of other rubber-based articles include suspension components, cushions, shoe soles, hoses, hockey pucks, conveyor belts, musical mouth pieces, bowling balls, rubber mats, etc.

Figure 2:
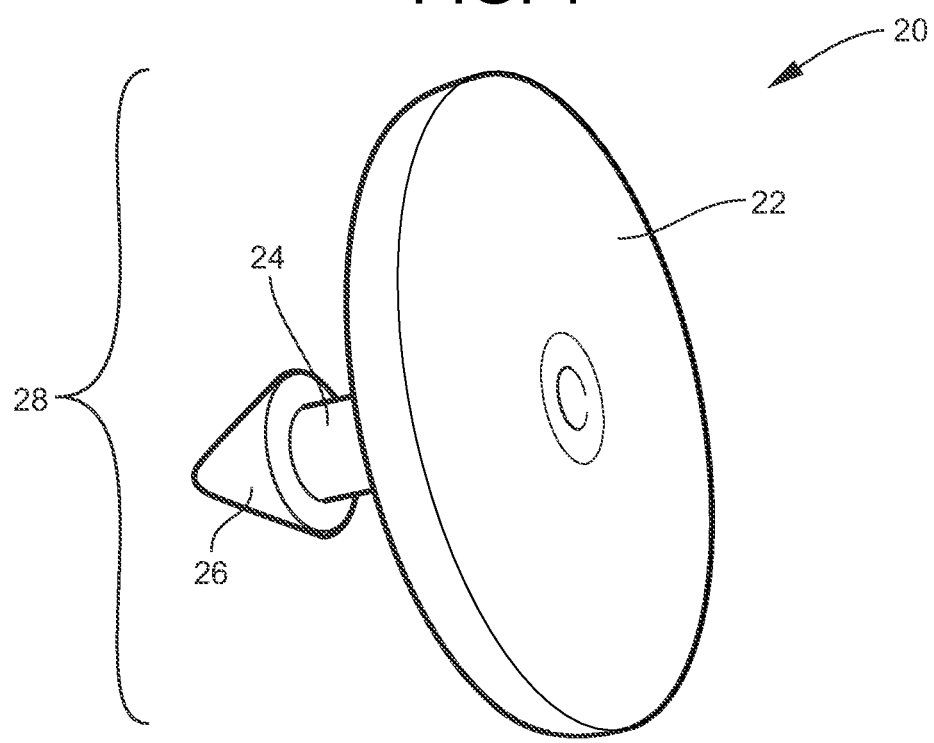
FIG. 2 is a top perspective view of the RFID plug of FIG. 1.

Referring to FIGS. 1 and 2, the RFID plug is shown at reference numeral 20, and generally includes an enlarged head 22 having a predetermined shape, an elongate stem 24, and a retention feature 26 spaced apart from the enlarged head by the elongate stem, which collectively make up the plug body 28. The enlarged head 22 and the retention feature 26 are disposed at opposite ends of the stem 24. The stem 24 is elongate such that a sufficient amount of tire material is "captured" between the enlarged head 22 and the retention feature 26 to stably maintain the RFID plug 20 within the tire while resisting pulling forces on the plug body 28. The enlarged head 22 contains the RFID device, such a passive RFID device generally including an antenna and IC. The retention feature 26 can be conical as shown or alternatively shaped (e.g., cylindrical, rectangular, or cuboid shaped). As further shown in FIGS. 1 and 2, the elongate stem 24 has an outer diameter that is smaller than, for example, the outermost surface(s) (diameters) of the retention feature 26 and enlarged head 22. Generally, the retention feature 26 is provided/shaped to grip internal portions of the tire and to resist pulling forces in a direction away from the tire. For example, as shown in FIGS. 1 and 2, when the retention feature 26 is conical shaped, the portion directly connected to the elongate stem 24 is substantially planar and flares out beyond the outer diameter of the elongate stem and this configurations resists pulling forces in a direction away from the tire and substantially aids in securing the RFID plug within the tire. Alternative shapes and structures of the retention feature 26 can include, but are not limited to, hooks, pins, projections, fins, bars, wires, etc. having any desired predetermined shape (e.g., circle, rectangle, triangle, cuboid, rhomboid, star shaped, etc.).

The plug body 28 is rigid and preferably becomes a unitary body after molding/vulcanization of the rubber article (tire) to prevent separation of any of the components thereof during the lifetime of the tire. As non-limiting examples, the plug body can be made from rigid plastics and/or rigid or semi-rigid thermoplastic elastomers, which include, but are not limited to PET, PP, high-density polypropylene (HDPE), PE, HDPE, TPU, TPE, such as TPS, TPO, TPV, TPC, or TPA. After molding, the RFID, RF transponder, and/or RFID tag may become an inseparable part of the finished plug. The plug body 28 can be further color coded or otherwise marked with indicia such as barcoding (e.g., 1d and 2d barcoding) depending on the application and need for differentiating certain labels from others either before or after being included in the article. In certain additional aspects, these marked indicia for differentiating plugs may further include engraving, etching (e.g., laser etching or acid etching), etc.

Figure 3:
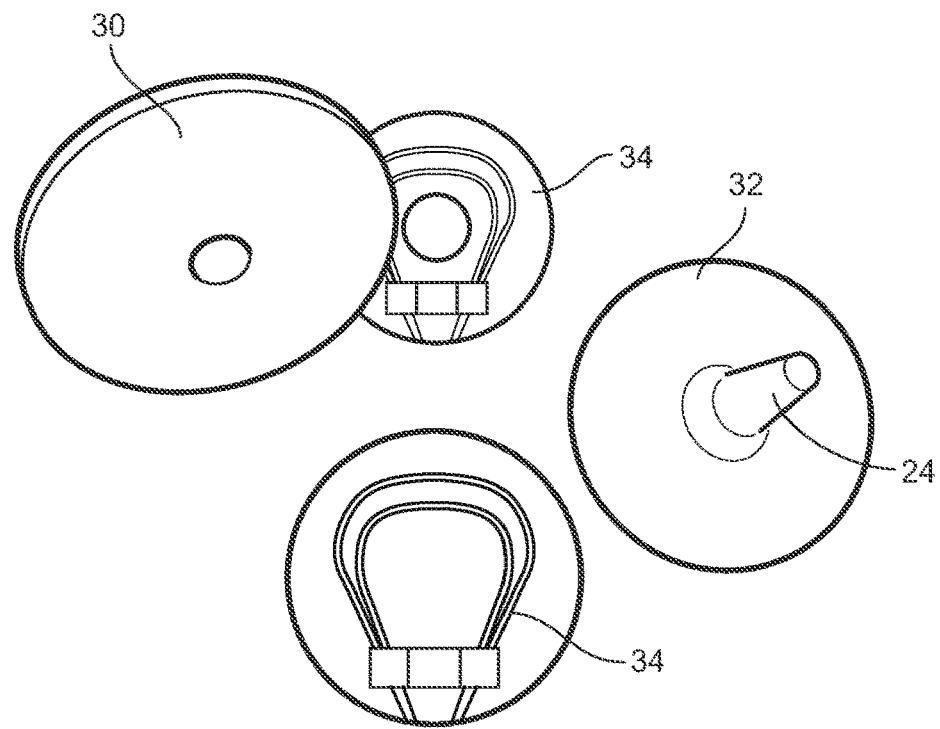
FIG. 3 shows the RFID plug components prior to RFID plug assembly.

Referring to FIG. 3, the enlarged head 22 includes a disk-shaped base 32 and a disk-shaped cap 30. The RFID device 34, which can be placed on and supported by or within a thin substrate as shown, that is disposed between the cap 30 and the base 32 such that the RFID device 34 is completely housed within the plug 20 when the plug is fully assembled. The cap 30 and base 32 are bonded or otherwise joined together and become inseparable. The stem 24 may taper proximate each of the enlarged head 22 and the retention feature 26 to strengthen the transitions to the two. In a particular embodiment, each of the base 32 and the cap 30 have a concentric opening for receiving one end of the stem 24 therethrough. Alternative embodiments are also envisioned in which the RFID device is positioned on the upper most surface of the cap 30 and is further sandwiched between the upper most surface of the cap and a protective outer layer.

Figure 4:
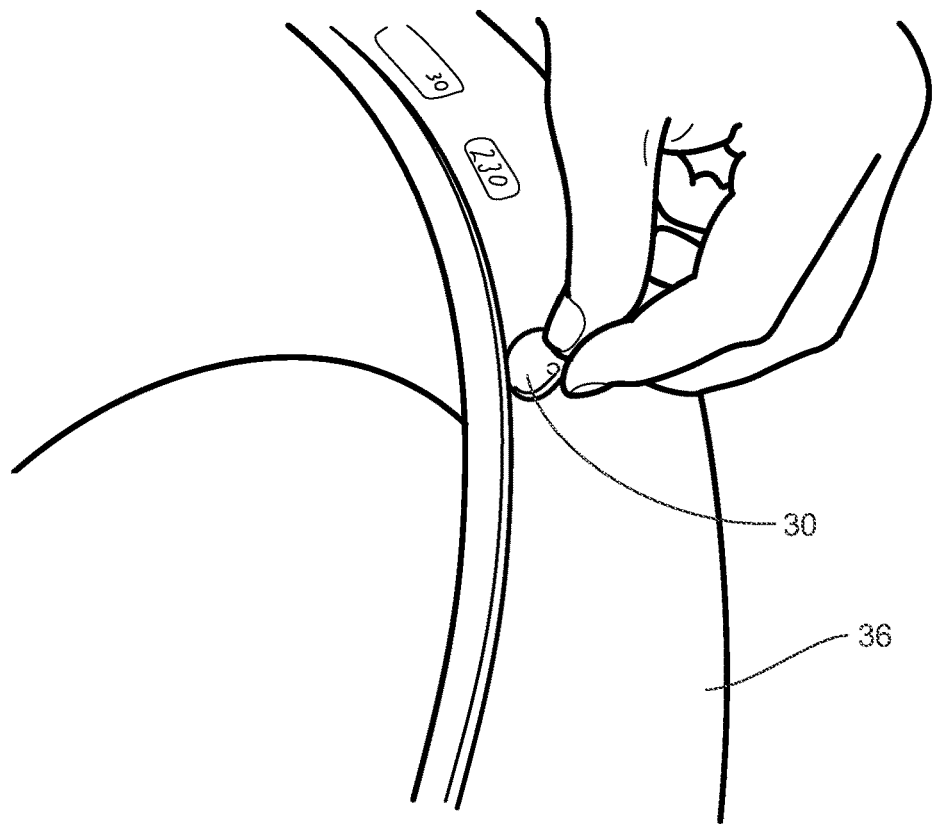
FIG. 4 shows the RFID plug being incorporated in a tire sidewall.

The RFID plug is preferably permanently affixed to the tire or other article. The terms "affix" or "affixed" as used herein refers to attaching or incorporating (or in alternative embodiments adhering) the RFID plug to or within the article. Affixed also includes embedding the RFID plug within the article such that at least a portion of the RFID plug resides within the finished article. For example, in certain instances, the retention feature 26 and elongate stem partially (or completely) reside in the article while the head 32 of the plug 30 is adjacent to or flush/coplanar with an outer surface of the finished article. FIG. 4 specifically shows the RFID plug having the retention feature and stem disposed within the tire such that the top portion of the cap 30 is aligned flush/coplanar with the tire sidewall 36 (an outer surface of the article), thus revealing the location of the label as well as presenting the label for scanning, identifying, and/or sensing conditions of the tire. In certain aspects, the method for permanently affixing an RFID plug to a rubber article (tire) includes:

(1) providing a green and/or unvulcanized rubber article (green and/or unvulcanized rubber tire) and an RFID plug to be affixed to the rubber article, the RFID plug being configured to track, identify, and/or sense conditions of the rubber article pre-vulcanization, during vulcanization, and/or post-vulcanization;

(2) before or concurrently with step (3), either manually or automatically inserting portions of the RFID plug (retention feature and stem) into the green and/or unvulcanized rubber article;

(3) placing the green and/or unvulcanized rubber article into the mold for vulcanization; and (4) vulcanizing the rubber article of step (3) by applying appropriate temperature and pressure to facilitate vulcanization thereby forming a vulcanized rubber article with the RFID plug positioned (and integrally formed) therein, wherein the RFID plug maintains operability throughout steps (1)-(4) thereby allowing for tracking, identifying, and/or sensing conditions of the rubber article pre-vulcanization, during vulcanization, and post-vulcanization.

Figure 5:
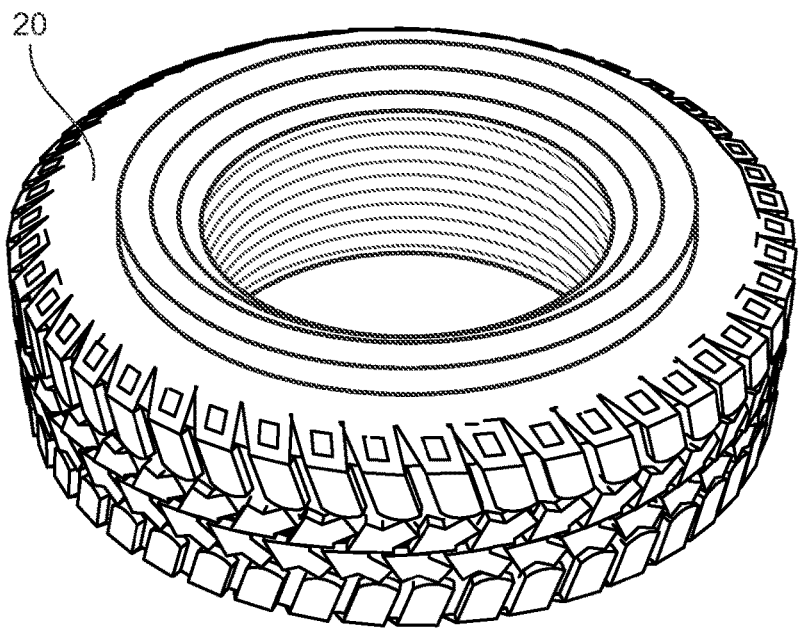
FIG. 5 is another depiction showing the RFID plug incorporated in another tire sidewall.
Figure 6:
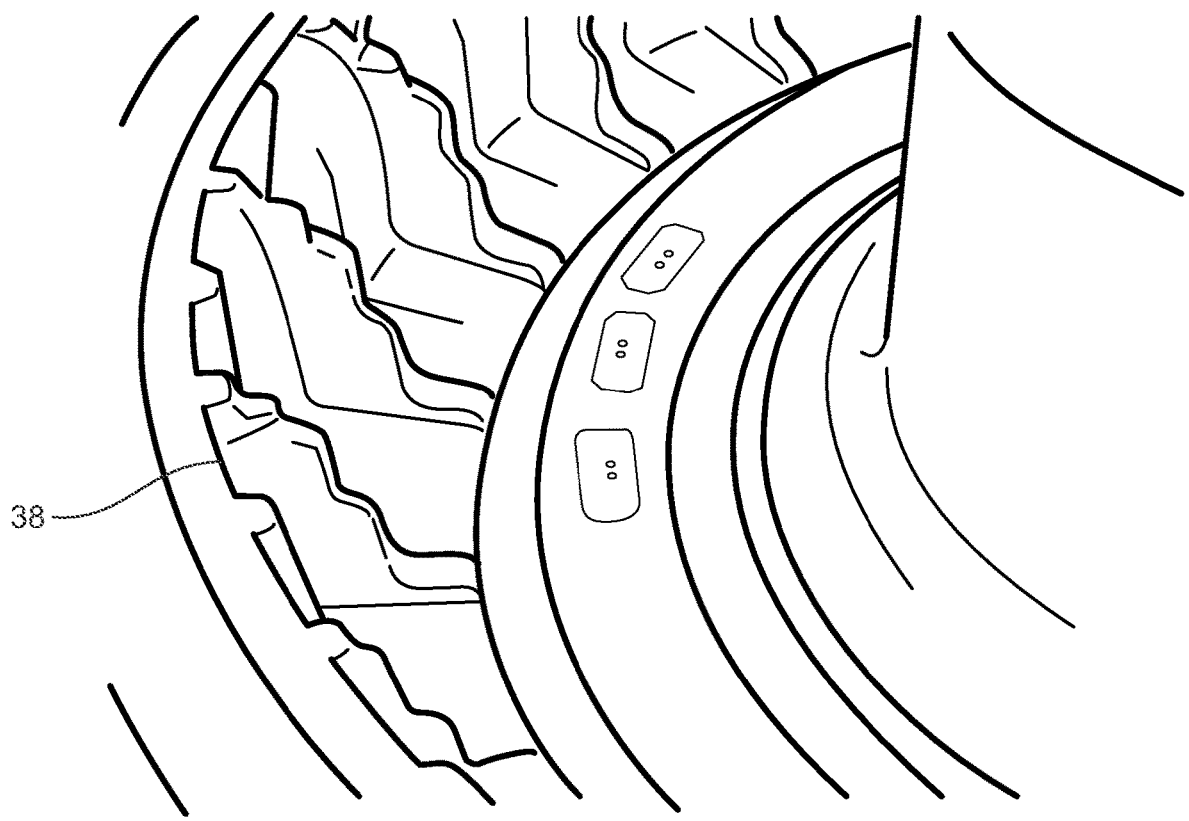
FIG. 6 depicts a tire mold and an exemplary location for positioning the RFID plug in the tire mold before loading the green tire into to the tire mold.

In certain aspects and as alluded to above, steps (2) and (3) occur either sequentially or concurrently. For example, when steps (2) and (3) occur sequentially, portions of the RFID plug are either manually or automatically inserted into the green and/or unvulcanized rubber article outside of the mold (i.e., before placing the green and/or unvulcanized rubber article into the mold). Alternatively, steps (2) and (3) may occur concurrently, which may be further referred to as "in mold tagging" in which the mold includes the RFID plug positioned therein that is further inserted into the green and/or unvulcanized rubber article during vulcanization of the article within the mold. As alluded to above, in certain aspects, the RFID plug initially consists of assembled rigid thermoplastic components, which preferably fuse together during vulcanization of the rubber article to form a unitary plug housing the RFID device therein and in which the RFID plug is preferably an integral, inseparable part of the article (tire) after step (4) that further maintains operability for tracking, identifying, and sensing conditions of the vulcanized article. For example, and when referring to FIG. 5, the tire can be a solid rubber tire, and the RFID plug 20 can be presented on the sidewall. Referring to FIG. 6, the RFID plug can be applied to a fixed location in a tire mold 38 indicated by a pin or a plurality of pins in the mold where the RFID plug will be pushed over and/or a marked position within the mold milled out where the plug can be applied. In addition to or alternatively, many tire molds further include interchangeable molding plates that are used to form various desired predetermined shapes and/or indicia on the tires, and in certain aspects, the "in mold tagging" may also comprise including one or more RFID plugs within these plates that is further positioned in the tire mold. As discussed above, the green/unvulcanized tire may be subsequently placed in the mold and the RFID plug positioned on the plate may be subsequently inserted into the tire during molding/vulcanization.

Figure 7:
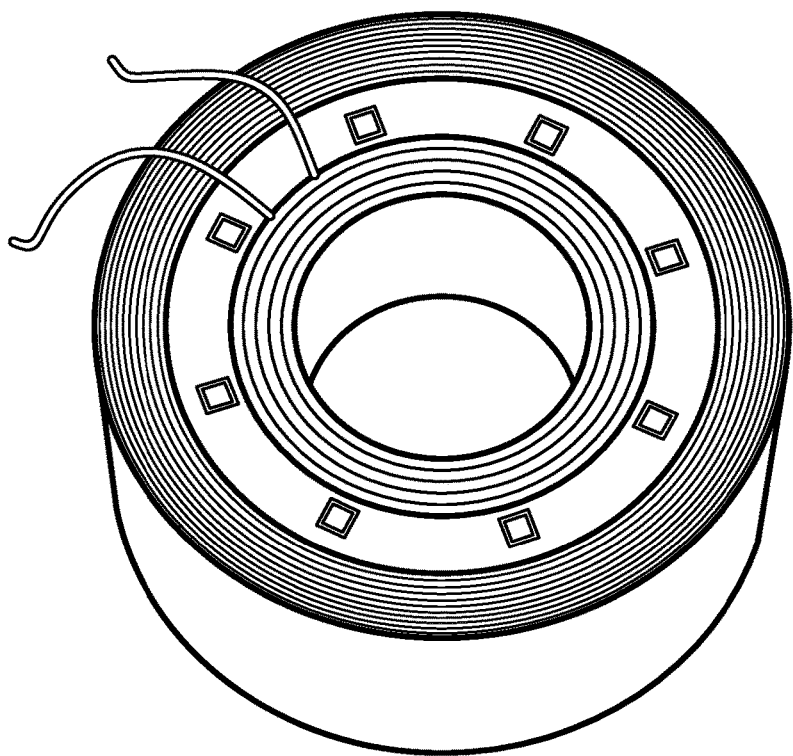
FIG. 7 depicts an exemplary green solid tire.
Figure 8:
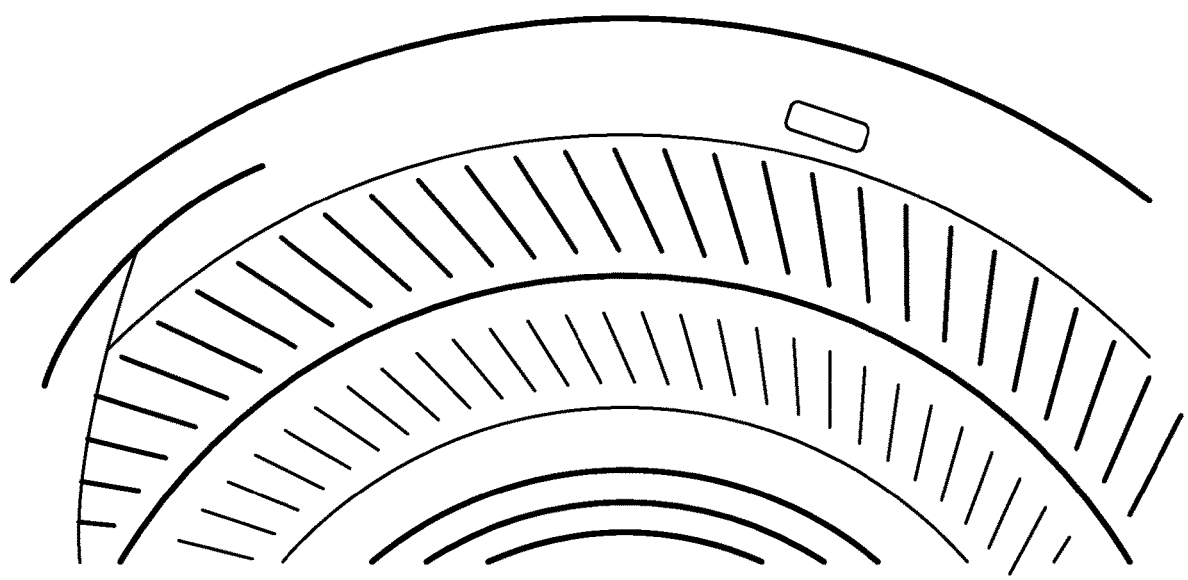
FIG. 8 depicts an exemplary heavy duty green tire.

Referring to FIGS. 7 and 8, the RFID plug 20 can be affixed to the article prior to subjecting the article to vulcanization.

The inventive concepts are further directed to methods of identifying a rubber-based article. The method can include affixing one or more RFID plugs to the rubber-based article, the RFID plug including an RFID component configured to provide a unique identifier or other information upon being read or otherwise interrogated. Once the RFID plug is affixed to the rubber-based article, the unique identifier is thus associated with that particular article. The RFID plug can be affixed to the article prior to vulcanization as discussed above or in certain applications, after vulcanization.

After affixing one or more RFID plugs with the article, the article can be identified by use of an RFID reader as previously described herein. Identification of the article enables a wide array of applications to be performed such as tracking the article in a manufacturing or production system, monitoring the location of the article, performing inventory operations, etc.

In certain aspects, the RFID plugs disclosed herein may be included in pre-packaged kits. These pre-packaged kits may include a plurality of the same RFID plugs, or alternatively these pre-packaged kits may include a plurality of RFID plugs that differ from one another—with, for example, the same type of RFID plugs being grouped together within the packaging and separated from other, different RFID plugs that are also included within the kit. When different plugs are included within the kit, the different plugs may include additional features distinguishing identical plugs from the different plugs within the kit. For example, the different plugs may have varied size, color, indicia, and/or structural configuration(s) of the plug(s).

In certain further aspects, the pre-packaged kits may further include an RFID reader configured to read the information transmitted from the RFID plugs disclosed herein.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An RFID plug adapted to be affixed to a tire pre-vulcanization that maintains operability for scanning, identifying, and/or sensing conditions of the tire before, during, and post-vulcanization of the tire, the RFID plug comprising:
    an elongate stem;
    a head disposed at a first end of the stem, the head containing an RFID device that is configured for scanning, identifying, and/or sensing conditions of the tire and to further communicate the same to an RFID reader; and
    a retention feature disposed at a second end of the stem opposite the first end, the retention feature configured to resist pulling forces on the head and the stem, wherein:
    the head is enlarged relative to the elongate stem and retention feature and includes an upper planar surface and a lower planar surface with the RFID device sandwiched there between such that the RFID device is completely encased within the head;
    the elongate stem, head, and retention features are an interconnected assembly of individual parts that are configured to fuse together to form an unitary housing upon being subjected to vulcanization conditions; and
    the elongate stem, head, and retention feature each comprising at least one of polyethylene terephthalate, polypropylene, polyethylene, thermoplastic polyolefinelastomers, thermoplastic vulcanize, thermoplastic copolyester, thermoplastic polyamides or any combination thereof.

2. The RFID plug of claim 1, wherein the retention feature is conical shaped having a pointed end that forms a distal end of RFID plug and a planar surface spaced apart from the pointed end that is directly connected to the elongate stem.

3. The RFID plug of claim 2, wherein the planar surface of the retention feature flares out beyond an outer diameter of the elongate stem and is configured to retain the RFID plug within the tire by resisting pulling forces in a direction away from the tire to secure the RFID plug within the tire.

4. The RFID plug of claim 3, wherein the head has a predeteremined shape comprising one of a circular/disc shape, a cuboid shape, a rectangualar shape, a rhomboid shape, a star shape.

5. The RFID plug of claim 4, wherein the head is circular/disc shaped and has a greater outer diameter than the elongate stem and the retention feature.

6. The RFID plug of claim 5, further comprising, an RFID device supporting substrate on which the RFID device is positioned, the supporting substrate being positioned between the upper and lower planar surfaces of the head.

7. The RFID plug of claim 6, wherein the RFID device supporting substrate corresponds in shape with the upper and lower surfaces of the head.

8. A kit comprising one or more RFID plugs of claim 1 pre-packaged therein.

9. The kit of claim 8, further comprising an RFID reader pre-packaged therein.

10. The kit of claim 9, wherein the kit comprises a plurality of different RFID plugs pre-packaged therein with identical RFID plugs being grouped together and separated from other different RFID plugs.

11. The kit of claim 8, wherein the kit comprises a plurality of different RFID plugs pre-packaged therein with identical RFID plugs being grouped together and separated from other different RFID plugs.

12. The RFID plug of claim 1, wherein the plug is adapted to be positioned on a tire sidewall such that the elongate stem resides partially or completely within the tire while the head is configured to be aligned and flush and/or coplanar with on outer surface of the tire sidewall.

13. A method for permanently affixing an RFD plug to a tire comprising:
(1) providing a green and/or unvulcanized tire and an RFID plug to be affixed to the green and/or unvulcanized tire, the RFD plug being configured to track, identify, and/or sense conditions of the tire pre-vulcanization, during vulcanization, and/or post-vulcanization;
(2) before or concurrently with step (3), either manually or automatically inserting portions of the RFID plug into the green and/or unvulcanized tire;
(3) placing the green and/or unvulcanized tire into the mold a mold for vulcanization; and
(4) vulcanizing the tire of step (3) to form a vulcanized tire with the RFID plug positioned therein, wherein the RFID plug maintains operability throughout steps (1)-(4) thereby allowing for tracking, identifying, and/or sensing conditions of the tire pre-vulcanization, during vulcanization, and post vulcanization, wherein the RFID plug comprises:
an elongate stem;
a head disposed at a first end of the stem, the head containing an RFID device that is configured for scanning, identifying, and/or sensing conditions of the tire and to further communicate the same to an RFID reader; and
a retention feature disposed at a second end of the stem opposite the first end, the retention feature configured to resist pulling forces on the head and the stem, wherein:
the head is enlarged relative to the elongate stem and retention feature and includes an upper planar surface and a lower planar surface with the RFID device sandwiched there between such that the RFID device is completely encased within the head;
the elongate stem, head, and retention features are an interconnected assembly of individual parts that are configured to fuse together to form an unitary housing upon being subjected to vulcanization conditions; and
the elongate stem, head, and retention feature each comprising at least one of polyethylene terephthalate, polypropylene, polyethylene, thermoplastic polyolefinelastomers, thermoplastic vulcanizates, thermoplastic copolyester, thermoplastic polyamides, or any combination thereof.

14. The method of claim 13, wherein the retention feature and elongate stem of the RFID plug are inserted within the tire during step (2) while the head remains adjacent or coplanar with an outermost surface of the tire to facilitate scanning, identifying, and/or sensing conditions of the tire.

15. The method of claim 14, wherein steps (2) and (3) occur sequentially.

16. The method of claim 14, wherein steps (2) and (3) occur concurrently.

17. The method of claim 16, wherein the RFID plug is positioned within the mold and insertion of the RFID plug into the green and/or unvulcanized tire occurs upon placing the tire therein.

18. The method of claim 13, wherein plug is adapted is positioned on a tire sidewall such that the elongate stem resides partially or completely within the tire and the head is aligned and flush and/or coplanar with on outer surface of the tire sidewall.

* * * * *

UNITED STATES PATENT AND TRADEMARK OFFICE
CERTIFICATE OF CORRECTION

PATENT NO. : 10,882,264 B2
APPLICATION NO. : 16/243374
DATED : January 5, 2021
INVENTOR(S) : Jos Uijlenbroek Page 1 of 1

It is certified that error appears in the above-identified patent and that said Letters Patent is hereby corrected as shown below:

In the Claims

Column 11, Lines 25 and 26 after "tire into" delete "the mold".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*